United States Patent [19]
Cooper et al.

[11] Patent Number: 5,350,051
[45] Date of Patent: Sep. 27, 1994

[54] AGITATOR APPARATUS FOR CYLINDRICAL ARTICLES

[75] Inventors: Ricky N. Cooper; Renee R. Cooper, both of Chesterfield; Charles P. Pendleton, Madison Heights; Steven R. Rinehart, Chesterfield; Louis R. Turano, Colonial Heights; Richard N. Webb, Richmond, all of Va.

[73] Assignee: Philip Morris Incorporated, New York, N.Y.

[21] Appl. No.: 160,308

[22] Filed: Dec. 2, 1993

[51] Int. Cl.⁵ .............................................. B65G 47/14
[52] U.S. Cl. ..................................... 198/396; 198/398; 198/533; 198/625; 198/663; 198/786
[58] Field of Search ................ 198/533, 625, 663, 786, 198/396, 454, 382, 455, 446, 398, 415

[56] References Cited

U.S. PATENT DOCUMENTS

| | | | |
|---|---|---|---|
| 1,353,075 | 8/1920 | Sibley . | |
| 1,461,265 | 7/1923 | Bullard | 198/533 X |
| 2,924,356 | 2/1960 | Pollmann et al. | 221/175 |
| 3,501,052 | 3/1970 | Rudszinat | 221/175 |
| 3,623,598 | 11/1971 | Anfossi | 198/165 |
| 3,715,056 | 2/1973 | Preston | 221/211 |
| 3,813,200 | 5/1974 | Gergely | 425/140 |
| 4,069,930 | 1/1978 | Atwell et al. | 214/302 |
| 4,174,780 | 11/1979 | Farrar et al. | 209/536 |
| 4,368,742 | 1/1983 | Wahle et al. | 131/88 |
| 4,420,073 | 12/1983 | Häusler et al. | 198/347 |
| 4,480,982 | 11/1984 | Sexstone et al. | 425/385 |
| 4,487,001 | 12/1984 | Tolasch et al. | 53/151 |
| 4,488,632 | 12/1984 | Focke et al. | 198/420 |
| 4,571,917 | 2/1986 | Wheless et al. | 53/148 |
| 4,572,352 | 2/1986 | Dyett et al. | 198/457 |
| 4,601,686 | 7/1986 | Luke et al. | 493/43 |
| 4,618,293 | 10/1986 | Heitmann | 406/28 |
| 4,646,938 | 3/1987 | Focke | 221/175 |
| 4,648,232 | 3/1987 | Brinker et al. | 53/54 |
| 4,740,113 | 4/1988 | Hirose et al. | 406/70 |
| 4,763,775 | 8/1988 | Jefferys et al. | 198/533 |
| 4,827,691 | 5/1989 | Hanada et al. | 53/151 |
| 4,844,240 | 7/1989 | Hütter et al. | 198/391 |
| 4,953,711 | 9/1990 | Focke | 209/535 |
| 4,962,629 | 10/1990 | Focke | 53/498 |
| 4,974,608 | 12/1990 | Gherardi | 131/94 |
| 5,018,539 | 5/1991 | Gamberini et al. | 131/280 |
| 5,224,811 | 7/1993 | Sigrist et al. | 414/289 |

FOREIGN PATENT DOCUMENTS

| | | | |
|---|---|---|---|
| 0277363A2 | 8/1988 | European Pat. Off. | B65B 19/04 |
| 0539324A1 | 4/1993 | European Pat. Off. | A24C 5/35 |
| 1020561 | 12/1957 | Fed. Rep. of Germany . | |
| 1537462A1 | 1/1990 | U.S.S.R. . | |
| 2188894A | 10/1987 | United Kingdom | B65G 47/26 |

Primary Examiner—Cheryl L. Gastineau
Attorney, Agent, or Firm—Kevin B. Osborne; James E. Schardt; Charles E. B. Glenn

[57] ABSTRACT

An apparatus for agitating cylindrical articles in a bulk flow and removing non-aligned articles from the flow includes a plurality of parallel, spaced rotating pins having helical threads on an outer surface. The flow of articles is directed through the pins and non-aligned articles are conveyed out of the flow direction by the threads while aligned articles pass across the pins. Eccentric rotation of the pins agitates the articles to assist maintaining free flow of the articles.

17 Claims, 4 Drawing Sheets

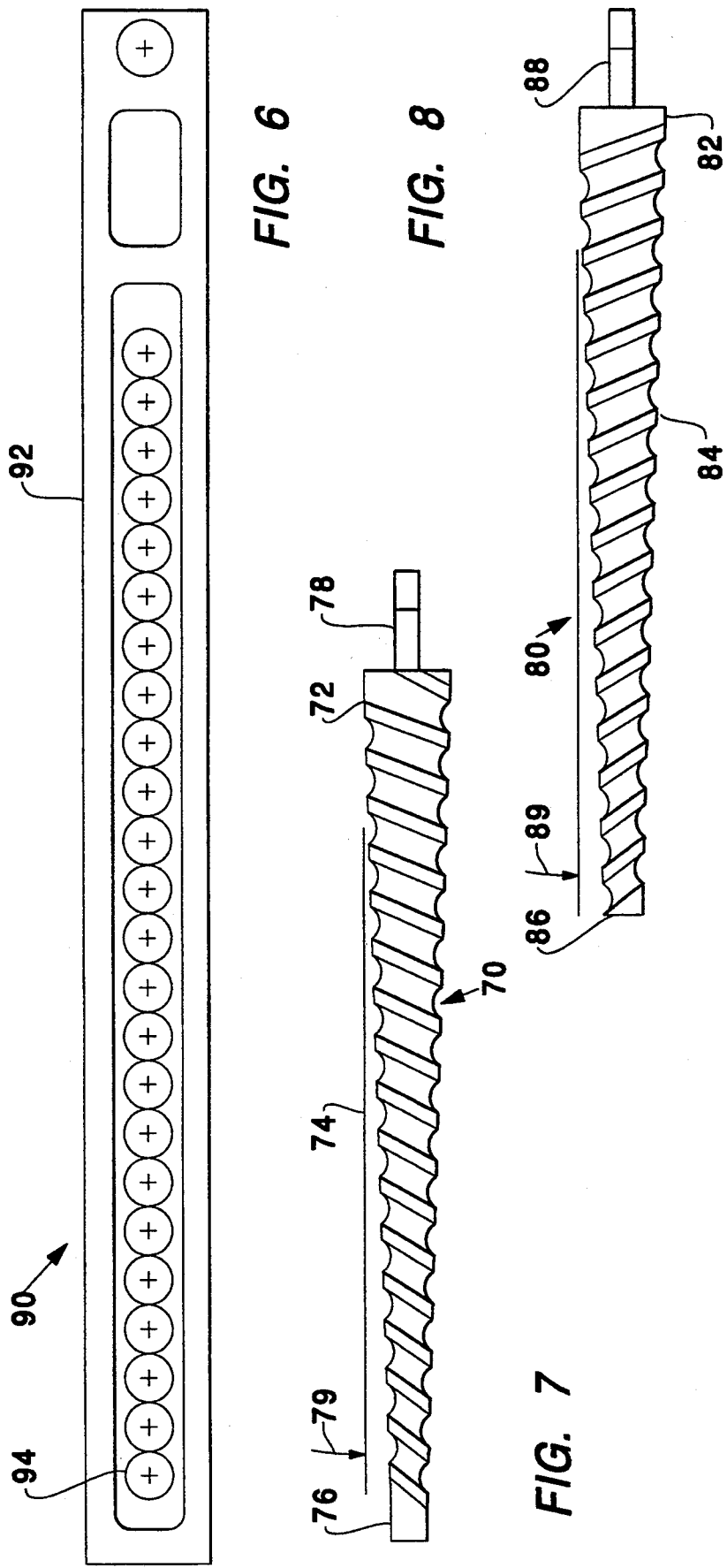

AGITATOR APPARATUS FOR CYLINDRICAL ARTICLES

FIELD OF THE INVENTION

The present invention relates to article handling and conveying systems for elongated cylindrical articles, such as cigarettes, tobacco rods and filter plugs. More particularly, the present invention relates to an apparatus for facilitating a mass flow of cylindrical articles and for arresting and removing non-aligned, or crossed, articles from the flow, thus ensuring that the articles maintain a predetermined alignment, and for preventing jamming of the articles in the flow.

BACKGROUND AND SUMMARY OF THE PRESENT INVENTION

The manufacture and packaging of smoking articles, such as cigarettes, involves the handling of very large numbers of relatively small and light weight cylindrical articles, for example, tobacco rods, filter plugs, and assembled cigarettes. Typical manufacturing and packaging systems process millions of smoking articles each day, and require high speed, precise handling of the corresponding millions of individual components that are formed, joined and packaged into the completed smoking article. The light weight and small size of the individual components, for example, tobacco rods and filter plugs, make rapid handling in large quantities difficult. The components can be easily disrupted from alignment with the flow by friction with the handling devices friction or collisions with each other, or by air movement.

The manufacturing process includes many associated processes that must be coordinated to produce the finished product. These include, for example, forming the tobacco rod, manufacturing the filter plug, attaching the filter plugs to the tobacco rods, and so on. These different processes may operate at different rates, be done at different times, or may be done in batches rather than continuously. To accommodate the different processes, the component parts are typically conveyed into and out of storage units according to the manufacturing requirements and output of the various processes.

Efficient handling of the components requires maintaining the articles in a particular orientation and alignment. Generally, cylindrical articles are arranged with their long axes transverse to the direction of flow, and are conveyed in a bulk flow, which resembles a large moving stack of logs or firewood. As the articles pass into and out of storage hoppers, or from bulk flow to narrower handling mechanisms, they roll or slide over each other. Frequently, friction between the articles, or between the articles and the conveying mechanism causes the articles to bunch or bind together and disrupt the flow. Agitation of articles in a hopper or conveyor is known to assist in moving the articles, as shown, for example, in U.S. Pat. No. 4,069,930 to Atwell et al.

In addition, during handling, the light weight and elongated length of the cylindrical articles predisposes them to become crossed, or out of alignment with the flow, and to cause jams in feeding or conveying apparatuses. Jams in a conveyor or other apparatus require that the apparatus be taken out of operation while an operator clears the jam, adding unnecessary time and cost to the processes.

The present invention provides an apparatus for facilitating a flow of cylindrical articles and for arresting and removing non-aligned, or crossed, articles from the flow, thus ensuring that the articles maintain a predetermined alignment and preventing jamming of the articles in the flow.

The present invention, generally, provides an apparatus for agitating the articles, that is, applying an oscillating force to the articles, in an article flow to assist in maintaining a free flow of the articles in a selected orientation.

In addition, the present invention provides an apparatus for removing non-aligned cylindrical articles from the flow to prevent jams in the conveying and handling systems.

More particularly, the present invention provides an apparatus that is interposed in a conveying apparatus and agitates the passing articles and removes non-aligned articles from the article flow. The apparatus is particularly useful where the articles are being conveyed in a mass flow conveyor for maintaining the free flow of the articles. The apparatus is also particularly effective where articles are being conveyed from a storage device, such as a hopper or tray, to a packaging vane where the alignment of the articles is important to the operation of the packaging vanes.

In a preferred embodiment of the invention, an apparatus for removing non-aligned articles comprises a plurality of elongated pins having helical threads on an outer surface. The pins are arranged in parallel and transverse to the direction of movement of the articles to form a screen through which the articles pass. The pins are mounted for eccentric rotation. The pins are rotated by conventional means, and the rotation agitates the cylindrical articles, assisting in maintaining the articles in alignment. Non-aligned articles are arrested by the pins and driven by the threads out of the conveyor, while aligned articles pass to a subsequent packaging station.

According to a preferred embodiment of the invention, the agitator apparatus includes a plurality of pins having a left handed helical thread from a first end to a midpoint, and a right handed thread from a second end to the midpoint. The pins arrest non-aligned articles and the threads drive the arrested articles out of the flow. By providing the pins with left and right hand threads, the arrested articles are driven the shortest possible distance out of the flow. The pins taper continuously from a maximum diameter at the midpoint to a minimum diameter at the first and second ends to facilitate the movement of the articles along the pin. Means for rotating the pins rotates all the pins in a single direction. The pins are mounted in an assembly so that the axes of rotation of the pins are mutually parallel and spaced so that a properly aligned article, that is, a cylindrical article oriented parallel to the pins, can pass between adjacent pins.

The agitator assembly may be arranged in an article hopper, advantageously at about the middle, to provide a grid through which the articles pass through the hopper to packaging vanes which collate the articles for packing. The orientation of a long axis of the cylindrical articles in the hopper is parallel with the axis of rotation of the pins.

According to a further aspect of the invention, the axis of rotation of the pins is eccentrically located, so that the pins execute rotation about the eccentric axis, which agitates the articles.

Another aspect of the present invention provides an air jet to blow articles removed from the flow path by the helical threads to a collecting bin.

In an alternative embodiment of the invention, each pin is provided with helical threads on an outside surface that are either all left handed or all right handed. These pins are mounted so that adjacent pins have alternating thread patterns. The pins are rotated in alternating directions for arresting and removing non-aligned articles from the flow.

In another alternative embodiment, each pin is provided with helical threads on an outside surface that are the same direction, and all the pins have the same thread direction. The pins in this embodiment are rotated in the same direction for arresting and removing non-aligned articles from the flow.

BRIEF DESCRIPTION OF THE DRAWING FIGURES

The present invention can be further understood with reference to the following description in conjunction with the appended drawings, wherein like elements are provided with the same reference numerals. In the drawings:

FIG. 6 is a rear view of an alternative embodiment of an agitator assembly;

FIG. 7 is a side view of an alternative embodiment of a threaded pin; and

FIG. 8 is a side view of another alternative embodiment of a threaded pin.

DETAILED DESCRIPTION OF PREFERRED EMBODIMENTS

Figure 1:
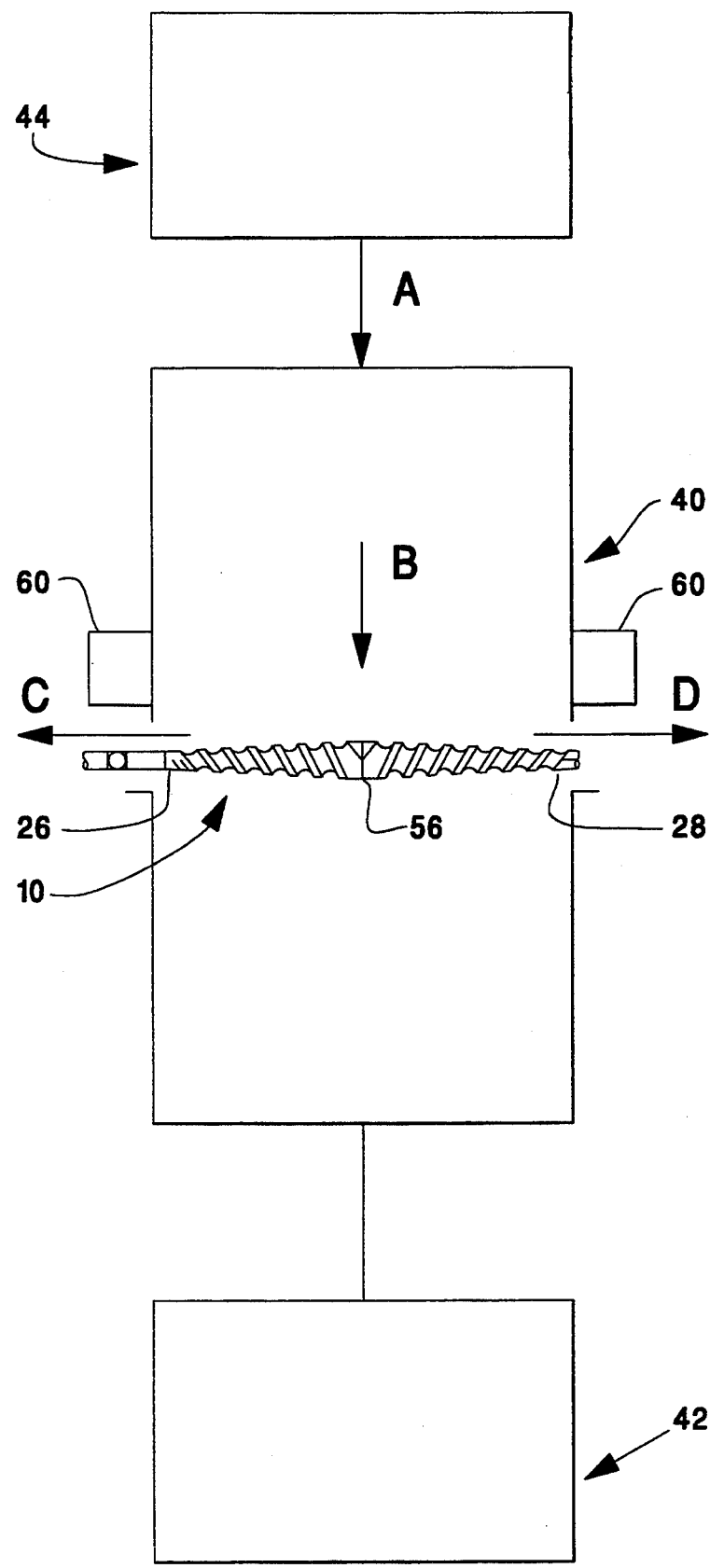
FIG. 1 is a schematic view of a hopper and packaging vane arrangement to show operating features of an agitator apparatus of the present invention.

FIG. 1 is a schematic view of a cigarette packaging arrangement including an article hopper 40 with an agitator apparatus 10 interposed in the hopper, and packaging vanes 42 located below the hopper. Although the invention is described below in conjunction with cigarette packaging equipment, the invention may be advantageously incorporated in mass or bulk handling systems for tobacco rods, filter plugs or other narrow cylindrical articles, and should not be construed to limited to the exemplary use described here.

As indicated in FIG. 1, cigarettes are conveyed, by suitable conveyor means 44, into the hopper 40, in the direction of arrow A. The hopper 40 stores the cigarettes and serves to modulate the flow of cigarettes to the packing vanes 42 for handling by the packing vanes and other downstream packaging equipment (not illustrated).

Cigarettes move by force of gravity through the hopper 40, in the direction of arrow B, to the vanes 42. The vanes 42 collate the cigarettes into the bundle arrangements, for example, in rows of seven, six and seven cigarettes familiar to consumers, for packaging by the packaging equipment. The correct orientation of the cigarettes when they enter the vanes 42 is very important for continuous functioning of the vanes.

The agitator apparatus 10 is positioned in the hopper 40 interposed in the flow of cigarettes through the hopper. The agitator apparatus 10 agitates the cigarettes in the hopper 40 so that they flow freely and in correct orientation through the hopper and into the vanes 42. The agitator apparatus 10 also serves to screen cigarettes passing through the hopper 40, allowing only correctly oriented cigarettes to pass through the agitator apparatus and removing incorrectly oriented cigarettes from the flow. The schematic view of FIG. 1 indicates a side view of the apparatus: the hopper 40 and the agitator apparatus 10 are understood to have a depth extending in the plane of the drawing sheet. Cigarettes that are not aligned with the flow B are arrested by the agitator apparatus 10 and removed from the hopper 40, in the direction of arrow C or D, as more completely described below.

It can be appreciated by those in the art that in a storage hopper 40, or in any typical mass flow device, the flow of cylindrical articles, such as cigarettes, is subject to twisting and crossing of the articles. Crossed, or non-aligned, cigarettes can jam the flow in the hopper, or downstream in a packaging vane, and impede the passage of cigarettes upstream of the jam. Jams disrupt the flow of cigarettes to the packaging machines and usually require a shut down of operation and operator intervention to clear the flow path. The screening and removing function of the agitator apparatus 10 prevents jamming caused by crossed or non-aligned cigarettes by removing the potentially disrupting articles from the flow.

Figure 2:
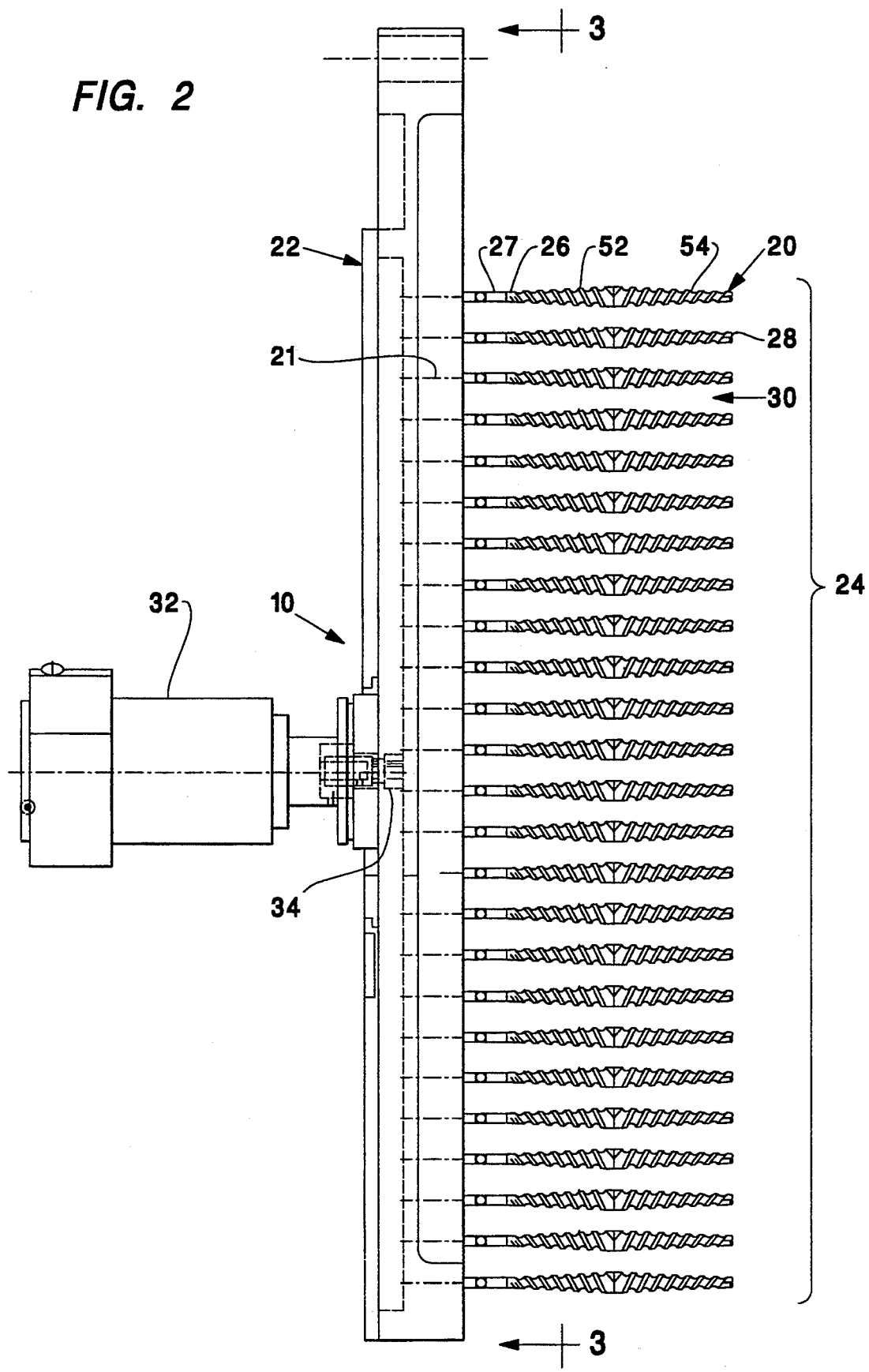
FIG. 2 is a top view of the agitator apparatus of the present invention.

FIG. 2 is a top view of an agitator apparatus 10 of the present invention. The agitator apparatus 10 comprises a plurality of elongated threaded pins 20 mounted on a support 22. A base end 26 of each pin 20 is attached to a mounting spindle 27, which is rotatably mounted in cantilever fashion in the support 22. A front tip 28 of the pin extends freely opposite the support 22. The pins 20 are arranged in a longitudinally parallel, spaced relationship to form a grid area 24. The grid area 24 acts as a screen in a flow path in the hopper 40, as schematically indicated in FIG. 1. The number of pins 20 is selected for the size of the flow path in a particular mass conveyor or flow device.

The pins 20 are positioned in the support 22 so that a space 30 between adjacent pins 20 is sufficiently wide to allow cylindrical articles, cigarettes, tobacco rods, or filter plugs, for example, to pass between adjacent pins 20, if the articles are oriented substantially parallel with the longitudinal axes 21 of the pins 20. Articles not parallel with the longitudinal axes 21 of the pins 20, that is, crossed articles, are arrested by the pins, and removed from the flow, as described below in connection with FIG. 4. The grid 24 in this way screens the cigarettes that flow from the hopper 40 to the vanes 42 to allow only aligned articles to pass through.

The support 22 includes drive means 32 for rotating the pins. Drive means 32 provides a drive force through a suitable transmission 34 for rotating the pins 20. The drive means 32 may be any suitable device, and in a preferred embodiment is an electric motor.

Figure 3:
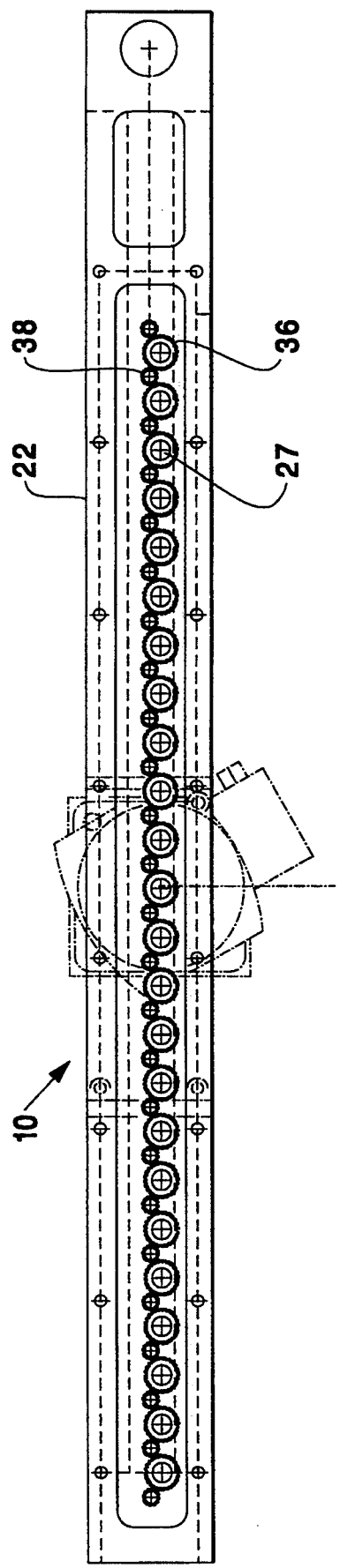
FIG. 3 is a front view of the agitator apparatus taken along the lines 3—3 of FIG. 2.

FIG. 3 is a front view of the agitator apparatus 10 in the direction of line 3—3 of FIG. 2. The motor 32 is illustrated in broken line in the view of FIG. 3 and the pins 20 are removed for clarity. The mounting spindle 27 of each pin 20 is rotatably mounted in the support 22 and includes a drive gear 36 fixed to the spindle. The gears 36 of each pin 20 are linked through a plurality of pinions 38 so that all of the pins are driven in the same direction by the motor 32.

Figure 4:
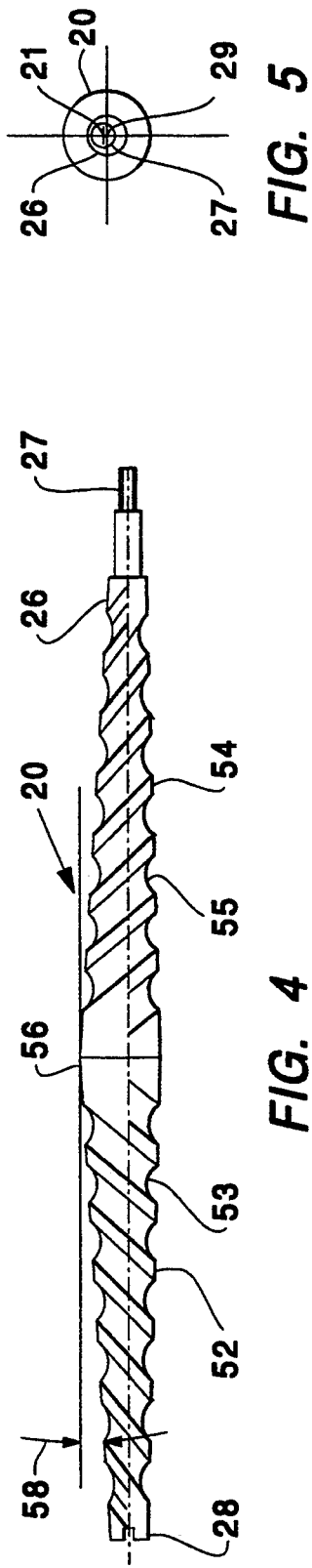
FIG. 4 is a side view of a threaded pin.

The pins 20 are configured for driving incorrectly oriented articles from the flow and for agitating the articles in the flow, as described below. FIG. 4 is a side view of a preferred embodiment of an agitator pin 20. The pin 20 is an elongated rod-like member having a base end 26, a free end, and a middle portion 56. The base end 26 is attached to a mounting spindle 27 for rotatably mounting the pin 20 in the support. The pin 20 is provided with helical threads 52 and 54 arranged on an outer surface of the pin at either side of a midpoint portion 56. The space 53, 55 between adjacent threads 52, 54 is selected so that a cylindrical article, such as a cigarette, coming into contact with the pin, and oblique to the long axis of the pin, is captured by the threads. Rotation of the pin 20 then drives the captured cigarette along the pin 20 until the cigarette is removed from the flow. The threads 52 to the left of the midpoint 56 shown in FIG. 4, are left handed, while the threads 54 on the right hand side of the midpoint are right handed threads. By providing two opposite thread patterns 52, 54, a cigarette captured on either side of the midpoint 56 of the pin 20 is driven directly to the nearest end of the pin, causing the least disruption of the flow.

The pin 20 is shaped with a taper 58 from a maximum width at the midpoint 56 to a minimum width at both the base end 26 and the front tip 28. The taper 58 of the pin 20 helps the pin drive an engaged cigarette out of the flow by pulling the cigarette under the flow as the cigarette moves away from the midpoint 56. In addition, the smaller diameter at the ends 26, 28 results in a higher linear speed of the threads that helps to accelerate the cigarette out of the flow.

Figure 5:
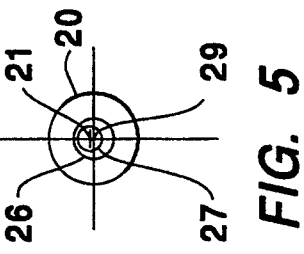
FIG. 5 is an end view of the pin of FIG. 4.

FIG. 5 is an end view of the pin 20 of FIG. 4. The mounting spindle 27, and thus the axis of rotation 21, of each pin 20 are offset from the geometric center 29 of the pin, as shown in FIG. 5. The pin 20 thus rotates about the eccentric axis of rotation 21. Rotation of the pin 20 about the eccentric axis 21 agitates the cigarettes positioned above the agitator apparatus 10 to assist the flow of the cigarettes.

Referring again to FIG. 2, the pins 20 are arranged in the support 22 so that the right handed threads 54 are adjacent to the support and the left handed threads 52 are distant from the support. This configuration is arbitrary, however, and should not be considered limiting. The pins 20 are rotated by the motor so that a crossed cigarette engaged by right handed threads 54 is driven to the support 22 and one engaged by the left handed threads 52 is driven to the front tip 28 of the pin 20. In this way, the crossed cigarette is moved the shortest distance, to remove it from the flow, and thus in the shortest time and with the least disruption of the rest of the flow. In a preferred embodiment of the invention, the pins 20 are rotated by the motor 32 at a speed in a range of 400 to 600 rpm, and preferably at about 500 rpm. This speed range has been found to be the most effective for performing both the agitating and removing functions without causing more crossed cigarettes or otherwise disrupting the flow.

Referring again to FIG. 1, the operation of the agitator apparatus 10 for removing a cigarette from the flow may be better understood. A cigarette captured to the left of the midpoint 56 is driven in the direction of arrow C out of the hopper 40. Cigarettes captured to the right of the midpoint 56 are driven in the direction of arrow D. Although a cigarette may not contact a pin 20 in perfect orientation to be captured by the threads 52, 54, the thread spacing 53, 55 and continual rotation of the threads succeeds in driving the cigarette away from the midpoint 56 and removing it from the flow. A cigarette driven from the flow reaches the end of the pins 20, at the base 26 or the front tip 28, and is collected by collecting means (not illustrated). The cigarette may then be returned by suitable means (not illustrated) to the hopper 40. Means 60 is provided for urging the cigarettes from the ends 26, 28 of the pins 20 to a collecting means. In a preferred embodiment, the means 60 comprises an air blower for directing a jet of air to blow driven cigarettes from the ends 26, 28 of the pins 20 to a collecting bin.

In alternative embodiments of the invention, the pins 20 may have a single thread pattern to drive captured articles to one end of the apparatus 10.

FIG. 7 shows a side view of one alternative embodiment of the pin 70. The pin 70 is a generally cylindrically shaped member having a base end 72. A mounting spindle 78 for mounting the pin in a support is attached to the base end 72. The mounting spindle 78 is eccentrically located on the base end 72. The pin 70 is provided with left handed threads 74 along the entire outer length. The pin 70 has a taper 79 from a maximum width at the base end 72 to a minimum width at a free end 76.

FIG. 8 shows a side view of a second alternative embodiment of a pin 80. Pin 80 is generally cylindrically shaped and also has a base 82 and a mounting spindle 88 attached to the base for mounting in a support. The mounting spindle 88 is eccentrically located on the base end 82. Pin 80 has right handed threads 84 along its entire length. The pin 80 is tapered from a maximum width at the base end to a minimum width at a free end 86 as indicated by an arrow 89.

In an alternative embodiment of the invention, the agitator apparatus 10 shown in FIG. 2 is provided with either all left handed 70 pins or all right handed 80 pins mounted in the support 22. The pins 70 or the pins 80, have eccentric mounting spindles 78 or 88, respectively, and are rotatably mounted in the support 22 to produce rotation about the eccentric axis for agitating the flow, as described above in connection with FIG. 5. The taper of the pins 70, 80, described above, helps the pins drive an engaged cigarette out of the flow by pulling the cigarette under the flow as the cigarette moves along the pin.

The threaded pins 70 or 80 are driven by the motor 32 and transmission in the same manner, that is, all the pins 70 or 80 are driven in the same direction. Crossed cigarettes are, for example, driven to the free end 86 of the right handed pins 80 and the front tip 76 of the left handed pins 70. The direction of rotation of the pins 20, and thus the direction captured cigarettes are driven from the flow, is selected based on the direction of the taper. The rotation is selected so that captured cigarettes will move from the widest part of the pin 20 to the narrowest, which as described above, assists in removing cigarettes from the flow.

In another alternative embodiment of the invention shown in FIG. 6, the agitator apparatus 90 is provided both with pins having left handed thread, as the pin 70 of FIG. 7, and pins having right handed thread, as the pin 80 of FIG. 8. FIG. 6 is a rear view of a support 92 of the alternative embodiment. The pins 70, 80 are mounted alternately in the support 92. The pins 70 or 80 are rotatably mounted in the support 92 and include gears 94 that drive each other directly, rather than through pinions as in FIG. 3. Through this arrangement, the gears 94 are driven so that adjacent pins 70 and 80 are driven in opposite directions. This results in cigarettes being driven to the same end of the pins 70, 80. The alternating thread patterns 74, 84 of adjacent pins 70, 80 quickly capture a twisted article because the threads face alternating oblique angles from the long axis of the pins. Because the pins 70, 80 are driven to remove articles in the same linear direction, the alternating threads help urge the captured cigarette and do not inhibit the movement of the captured cigarette from the flow.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed is:

1. An apparatus for preventing jams in a flow of cylindrical articles, comprising:
    a plurality of pins, the pins rotatably mounted with parallel axes of rotation in a frame, the pins being interposed in a flow of articles;
    the pins being spaced apart for passage between adjacent pins of an article aligned parallel to the axes of rotation of the pins;
    each pin having helical threads on an outer surface of the pin for conveying a non-aligned article out of the flow; and,
    means for rotating the pins.

2. The apparatus as claimed in claim 1, wherein the means for rotating the pins rotates the pins at a speed in a range of 400 to 600 revolutions per minute.

3. The apparatus as claimed in claim 1, further comprising means for agitating the articles in the flow.

4. The apparatus as claimed in claim 3, wherein the means for agitating the articles comprises the pins being rotatably mounted in said frame on eccentric axes of rotation.

5. The apparatus as claimed in claim 1, wherein each pin has a first end, a midpoint and a second end and wherein the threads from the first end to the midpoint are left handed, and the threads from the second end to the midpoint are right handed.

6. The apparatus as claimed in claim 5, wherein said pins are generally cylindrical and an outer profile of the pins tapers continuously from a maximum thickness at the midpoint to a minimum thickness at the first and second ends.

7. The apparatus as claimed in claim 1, wherein the means for rotating the pins rotates the pins in a single direction.

8. The apparatus as claimed in claim 1, further comprising means for urging arrested and removed articles from the pins.

9. The apparatus as claimed in claim 8, wherein the means for urging arrested and removed articles is an air blower.

10. The apparatus as claimed in claim 1, wherein each pin has one of a right hand and left hand helical thread from a first end to a second end, and the pins are arranged in the frame so that threads of adjacent pins are alternately right and left handed.

11. The apparatus as claimed in claim 10, wherein the pins are substantially cylindrically shaped and have an eccentric axis of rotation.

12. The apparatus as claimed in claim 10, wherein the pins are tapered from a maximum width at the first end to a minimum width at the second end.

13. The apparatus as claimed in claim 10, wherein the means for rotating the pins rotates alternatingly positioned pins in opposite directions.

14. The apparatus as claimed in claim 1, wherein each pin has a same thread direction from a first to a second end.

15. The apparatus as claimed in claim 14, wherein the pins are substantially cylindrically shaped and have an eccentric axis of rotation.

16. The apparatus as claimed in claim 14, wherein the means for rotating the pins rotates adjacent pins the same direction.

17. The apparatus as claimed in claim 14, wherein the pins are tapered from a maximum diameter at the first end to a minimum diameter at the second end.

* * * * *